United States Patent
Saito

(10) Patent No.: US 9,347,514 B2
(45) Date of Patent: May 24, 2016

(54) MAGNETIC VISCOUS FLUID DAMPER AND MANUFACTURING METHOD OF COIL ASSEMBLY USED THEREFOR

(71) Applicant: KAYABA INDUSTRY CO., LTD., Tokyo (JP)

(72) Inventor: Keiji Saito, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/380,403

(22) PCT Filed: Dec. 3, 2012

(86) PCT No.: PCT/JP2012/081252
§ 371 (c)(1),
(2) Date: Aug. 22, 2014

(87) PCT Pub. No.: WO2013/125123
PCT Pub. Date: Aug. 29, 2013

(65) Prior Publication Data
US 2015/0041263 A1 Feb. 12, 2015

(30) Foreign Application Priority Data
Feb. 24, 2012 (JP) .................. 2012-039160

(51) Int. Cl.
*F16F 9/53* (2006.01)

(52) U.S. Cl.
CPC ..................... *F16F 9/535* (2013.01)

(58) Field of Classification Search
CPC ................... F16F 9/535; F16F 15/03
See application file for complete search history.

(56) References Cited

U.S. PATENT DOCUMENTS

| 6,053,291 | A | * | 4/2000 | Shibahata | F16F 15/03 188/266.1 |
|---|---|---|---|---|---|
| 6,260,675 | B1 | | 7/2001 | Muhlenkamp | |
| 6,279,702 | B1 | * | 8/2001 | Koh | F16F 9/535 188/267.2 |
| 6,360,856 | B1 | * | 3/2002 | Koh | F16F 9/535 188/267.1 |
| 2001/0035317 | A1 | * | 11/2001 | Sakai | F16F 9/466 188/266.2 |
| 2008/0251982 | A1 | * | 10/2008 | Sekiya | B60G 17/06 267/140.14 |
| 2009/0107779 | A1 | * | 4/2009 | Azekatsu | F16F 9/535 188/267.2 |
| 2009/0294231 | A1 | | 12/2009 | Carlson et al. | |

FOREIGN PATENT DOCUMENTS

| EP | 2317172 A2 | 5/2011 |
|---|---|---|
| JP | 2009-216210 A | 9/2009 |
| WO | WO-2011/145357 A1 | 11/2011 |

OTHER PUBLICATIONS

Extended European Search Report dated Oct. 30, 2015.

* cited by examiner

*Primary Examiner* — Vishal Sahni
(74) *Attorney, Agent, or Firm* — Rabin & Berdo, P.C.

(57) ABSTRACT

A magnetic viscous fluid damper includes: a cylinder; a piston that is slidably interposed within the cylinder; two fluid chambers that are partitioned by the piston; a hollow rod that is coupled to the piston; an electromagnetic coil that is formed with a magnet wire wound around the piston; two lead wires that extend from both ends of the magnet wire; and a coil assembly in which the electromagnetic coil and the two lead wires are embedded in a mold resin. The piston includes a hollow first core coupled to the rod and a second core that sandwiches the coil assembly with the first core. The two lead wires are passed through the inside of the first core and are electrically continuous with an electric wire passed through the inside of the rod.

10 Claims, 8 Drawing Sheets

MAGNETIC VISCOUS FLUID DAMPER AND MANUFACTURING METHOD OF COIL ASSEMBLY USED THEREFOR

TECHNICAL FIELD

The present invention relates to a magnetic viscous fluid damper and a manufacturing method of a coil assembly used in such a magnetic viscous fluid damper.

BACKGROUND ART

U.S. Pat. No. 6,260,675B1 discloses a magnetic viscous fluid damper installed in a vehicle. The magnetic viscous fluid damper controls the amount of current passed through an electromagnetic coil interposed in a piston to change the strength of a magnetic field generated in the electromagnetic coil, and thereby changes the apparent viscosity of a magnetic viscous fluid.

The electromagnetic coil provided in the magnetic viscous fluid damper is formed with a magnet wire in which one end is connected to the piston and the other end is connected to one electric wire (lead wire). The electric wire is taken, through a rod extending from the piston, out of the damper, and is connected to a controller installed in the vehicle.

A drive current output from the controller is passed through the electric wire to the electromagnetic coil, flows through the electromagnetic coil and is then passed through the piston, the rod, a vehicle body and the like to the negative electrode of a battery.

SUMMARY OF INVENTION

However, in the conventional magnetic viscous fluid damper described above, since the drive current passed to the electromagnetic coil is passed through the piston, the rod, the vehicle body and the like, it is necessary to perform insulating processing on other electrical devices and the like installed in the vehicle.

Furthermore, since the controller uses one electric wire taken out of the magnetic viscous fluid damper to supply the drive current, the configuration of a drive circuit that outputs the drive current is restricted.

Furthermore, since the electromagnetic coil is incorporated into the piston, one end of the magnet wire of the electromagnetic coil is connected to the piston and thereafter it is necessary to enclose them with a mold resin, it is difficult to efficiently assemble the piston.

It is an object of the present invention to provide a magnetic viscous fluid damper in which a drive current is passed to an electromagnetic coil without flowing through a piston, a vehicle body and the like and which can improve the assembly of the piston and a manufacturing method of a coil assembly used in such a magnetic viscous fluid damper.

According to one aspect of the present invention, a magnetic viscous fluid damper using a magnetic viscous fluid is provided. The magnetic viscous fluid damper includes a cylinder that the magnetic viscous fluid is sealed in, a piston that is slidably interposed within the cylinder, two fluid chambers that are partitioned by the piston, a hollow rod that is coupled to the piston and protrudes to an outside of the cylinder, an electromagnetic coil that is formed with a magnet wire wound around the piston, two lead wires that extend from both ends of the magnet wire, and a coil assembly in which the electromagnetic coil and the two lead wires are embedded in a mold resin, wherein. The piston includes a hollow first core coupled to the rod and a second core that sandwiches the coil assembly with the first core. The two lead wires are passed through an inside of the first core and are electrically continuous with an electric wire passed through an inside of the rod.

Embodiments of the present invention and advantages thereof are described in detail below with reference to the accompanying drawings.

DESCRIPTION OF EMBODIMENTS

Embodiments of the present invention will be described below with reference to accompanying drawings.

A first embodiment will first be described.

Figure 1:
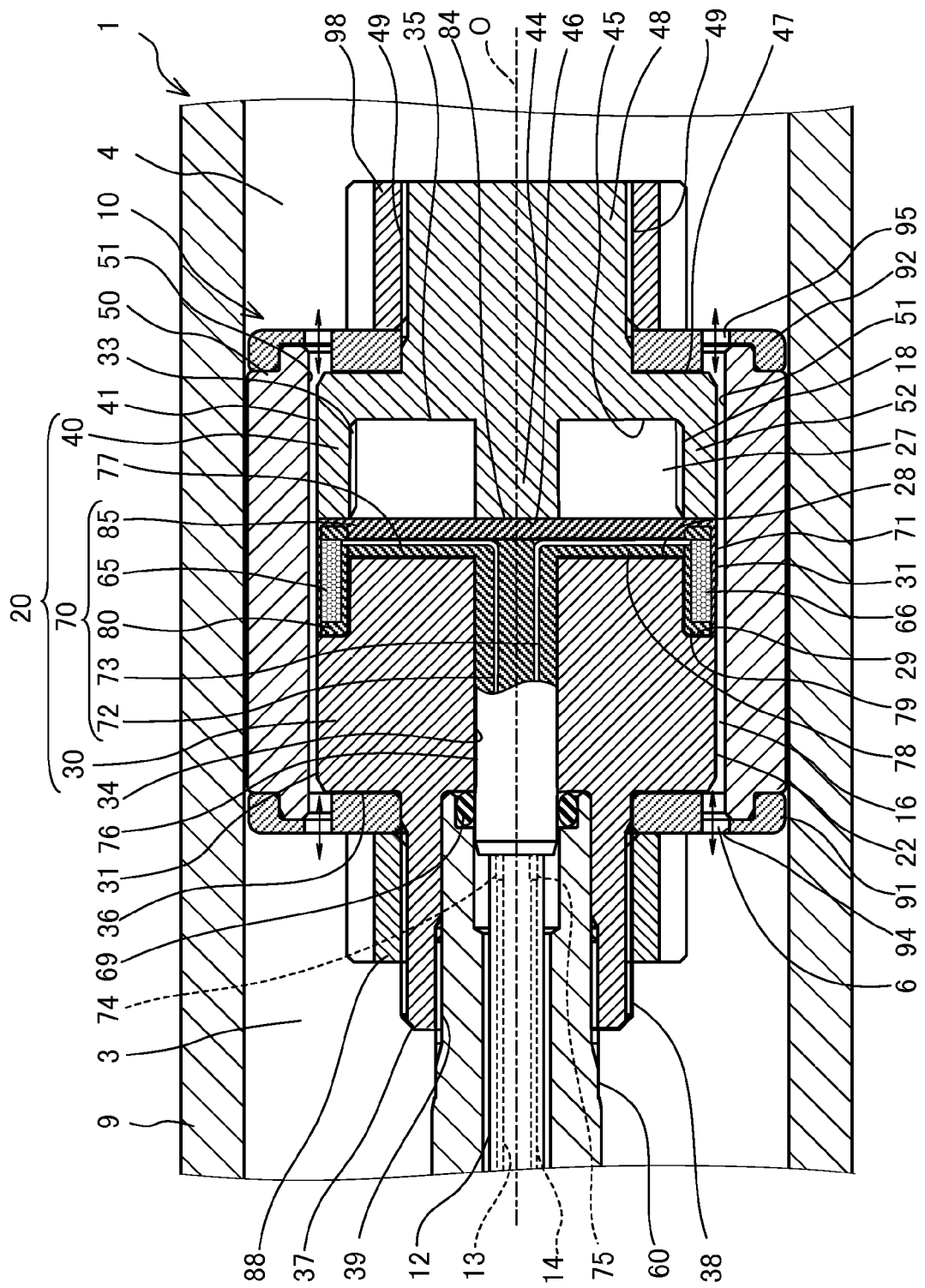
FIG. 1 is a cross-sectional view of a magnetic viscous fluid damper according to a first embodiment of the present invention.

FIG. 1 is a cross-sectional view of a piston portion of a magnetic viscous fluid damper (hereinafter simply referred to as a "damper 1"). The damper 1 is interposed between the vehicle body and an axle of a vehicle such as an automobile, and performs an expansion and contraction operation to generate a damping force that reduces the vibration of the vehicle body.

The damper 1 includes a cylindrical cylinder 9 that a magnetic viscous fluid is sealed in and a piston 10 that is slidably arranged within the cylinder 9 and partitions the interior of the cylinder 9 into two fluid chambers 3 and 4.

One end of a rod 60 is coupled to a first core 30 of the piston 10. The other end of the rod 60 is provided to extend to the outside of the cylinder 9. The other end of the rod 60 is coupled to one of the vehicle body and the axle, and the cylinder 9 is coupled to the other. Thus, as the axle is moved with respect to the vehicle body, the rod 60 and the cylinder 9 are relatively moved, with the result that the damper 1 performs the expansion and contraction operation.

In the fluid chambers 3 and 4 within the cylinder 9, a gas chamber (not shown) is defined through a free piston (not shown), and the gas chamber compensates for volumetric change caused by the entry and exit of the rod 60.

The piston 10 includes a piston core assembly 20 that is coupled to the rod 60, a cylindrical flux ring 50 that is arranged a predetermined distance apart from the outer circumference of the piston core assembly 20, plates 91 and 92 that support the flux ring 50 and nuts 88 and 98 that fasten the plates 91 and 92 respectively to the piston core assembly 20.

The piston core assembly 20 includes a coil assembly 70 in which an electromagnetic coil 65 and two lead wires 72 and 73 are embedded in a mold resin, a hollow first core 30 that holds the coil assembly 70 and a second core 40 that sandwiches the coil assembly 70 with the first core 30.

The damper 1 includes, as damping force generation elements, a main flow path 6 that penetrates the piston 10 and that makes the two fluid chambers 3 and 4 communicate with each other and a bypass flow path (not shown) that makes the two fluid chambers 3 and 4 communicate with each other parallel to the main flow path 6.

The main flow path 6 is formed with a gap 16 that is defined between the outer circumferential surface 22 of the piston core assembly 20 and the inner circumferential surface 51 of the flux ring 50 and main opening portions 94 and 95 that are open to the plates 91 and 92.

The piston core assembly 20 and the flux ring 50 are arranged concentrically along the center line O of the piston 10, and the gap 16 is defined annularly. In the plates 91 and 92, a plurality of main opening portions 94 and 95 that are open toward the gap 16 are formed.

In the piston core assembly 20, the electromagnetic coil 65 that generates a magnetic field is provided. The electromagnetic coil 65 is formed by winding a magnet wire 66 in the shape of a coil, and the two lead wires 72 and 73 are connected to both ends of the magnet wire 66. The electromagnetic coil 65 generates the magnetic field by the passage of a current through the magnet wire 66 via the lead wires 72 and 73.

The magnetic viscous fluid is obtained by dispersing minute particles having ferromagnetism in a liquid such as oil, and its apparent viscosity is changed by the strength of the magnetic field.

At the time of operation of the damper 1, when the piston 10 slides within the cylinder 9, the magnetic viscous fluid flows through the main flow path 6 as indicated by arrows in FIG. 1, and moves between the fluid chambers 3 and 4 on both sides of the piston 10. Here, when a current is passed through the electromagnetic coil 65, the magnetic field acts on the magnetic viscous fluid flowing through the main flow path 6, the viscosity of the magnetic viscous fluid is changed. As the strength of the magnetic field of the electromagnetic coil 65 is increased, the viscosity of the magnetic viscous fluid is increased, and thus the damping force generated by the damper 1 is also increased.

The top end portion of the rod 60 is screwed into a screw hole 39 of the first core 30, and the rod 60 is coupled to the piston core assembly 20. The top end of the rod 60 is in contact with the bottom surface of the screw hole 39. An 0 ring 69 is interposed between the bottom surface of the screw hole 39, the outer circumferential surface of a plug portion 76 of the coil assembly 70 protruding from the bottom surface of the screw hole 39 and the inner circumferential portion of the rod 60. The inside of the rod 60 is sealed with the O ring 69 so as to prevent the entrance of the magnetic viscous fluid.

When the piston 10 is assembled, a harness 12 having two electric wires extending from an unillustrated controller is inserted through the inside of the hollow rod 60, and the electric wires 13 and 14 of the harness 12 are connected to terminals 74 and 75, respectively. Thus, the two lead wires 72 and 73 extending from the electromagnetic coil 65 pass through the inside of the first core 30, and are electrically continuous to electric wires 13 and 14 passing through the inside of the rod 60.

When the damper 1 is operated, a drive current output from the controller is supplied to the electromagnetic coil 65 through the electric wires 13 and 14 of the harness 12 and the lead wires 72 and 73. Since this drive current is passed to the electromagnetic coil 65 without being passed through the piston 10, the rod 60, the vehicle body and the like, electrical effects exerted on other electrical devices and the like installed in the vehicle are reduced, and thus it is not necessary to perform insulating processing on the other electrical devices and the like.

The controller (not shown) controls the amount of current passed through the electromagnetic coil 65 to adjust the damping force that needs to be generated in the damper 1.

Since the controller can include a bridge circuit that outputs the drive current to the electromagnetic coil 65 or the like using the two electric wires 13 and 14, it is possible to enhance control responsivity.

The piston core assembly 20 is formed by assembling the coil assembly 70, the first core 30 and the second core 40. The coil assembly 70, the first core 30 and the second core 40 are arranged concentrically along the center line O of the piston 10.

The coil assembly 70 includes a primary mold member 80 that is molded such that the two lead wires 72 and 73 are embedded, the electromagnetic coil 65 that is formed with the magnet wire 66 wound around the outer circumference of the primary mold member 80 and a secondary mold member 85 that is molded such that the electromagnetic coil 65 is embedded between the secondary mold member 85 and the primary mold member 80.

The electromagnetic coil 65 is enclosed by the mold resin and a needless gap that is formed within the electromagnetic coil 65 can be reduced. Thus, it is possible to secure the insulation of the electromagnetic coil 65 and reduce the transmission of variations in pressure within the cylinder 9 to the inside of the electromagnetic coil 65.

The coil assembly 70 is sandwiched between the first core 30 and the second core 40.

In the first core 30, the following portions are formed as portions that hold the coil assembly 70: a ring-shaped bobbin holding portion 32 that holds a bobbin portion 79 (see FIG. 2A), a slit-shaped bridge holding concave portion 27 that holds bridge portions 77 and 78 and a plug holding hole 34 into which a plug portion 76 is inserted.

In the first core 30 to which the rod 60 is coupled, two semi-cylindrical shaft portions 18 that protrude to the opposite side (the top end side) of the rod 60 are formed. Between the semi-cylindrical shaft portions 18, the bridge holding concave portion 27 that holds the bridge portions 77 and 78 is open. In other words, the semi-cylindrical shaft portions 18 are semi-cylindrical portions that are aligned to sandwich the bridge holding concave portion 27.

In the outer circumference of each of the semi-cylindrical shaft portions 18, a male screw 33 that is screwed into the second core 40 is formed. The outer circumference of each of the semi-cylindrical shaft portions 18 and the outer circumferential surface 71 of the coil assembly 70 are formed concentrically along the center line O. The top end surface 35 of each of the semi-cylindrical shaft portions 18 is formed in the shape of a flat surface perpendicular to the center line O.

In the first core 30, the plug holding hole 34 that penetrates its center portion is formed, and the plug portion 76 is inserted into the plug holding hole 34.

The bridge portions 77 and 78 are fitted into the bridge holding concave portion 27, and the plug portion 76 is inserted into the plug holding hole 34, and thus the coil assembly 70 is interposed in the inside of the first core 30.

The substantially cylindrical first core 30 includes an outer circumferential surface 31 that extends without any step with the outer circumferential surface 71 of the coil assembly 70, a flat surface-shaped base end surface 36 perpendicular to the center line O and a boss portion 37 that protrudes from the base end surface 36. In the outer circumference of the cylindrical boss portion 37, a male screw 38 is formed. Between the base end surface 36 of the first core 30 and the nut 88, the plate 91 is provided, and the nut 88 is screwed to the male screw 38 to sandwich the plate 91.

The screw hole 39 is formed in the inside of the boss portion 37. The top end portion of the rod 60 is screwed into the screw hole 39, and thus the rod 60 is coupled to the first core 30.

The substantially cylindrical second core 40 includes a cylindrical yoke portion 52 that is coupled to the outer circumference of each of the semi-cylindrical shaft portions 18. The outer circumferential surface 41 of the yoke portion 52 extends without any step with the outer circumferential surface 71 of the coil assembly 70. The yoke portion 52 of the second core 40 is provided side by side with the electromagnetic coil 65 in the axial direction of the piston 10, and thus the magnetic flux of the electromagnetic coil 65 is guided to the gap 16.

The second core 40 includes a convex portion 44 that protrudes in the shape of a cylinder to the inside of the yoke portion 52. Between the yoke portion 52 and the convex portion 44, a ring-shaped concave portion 53 (see FIG. 2A) with which each of the semi-cylindrical shaft portions 18 of the first core 30 engages is defined. A female screw 43 (see FIG. 2A) is formed in the inner circumference of the yoke portion 52, and the female screw 43 is screwed to the male screw 33 formed in the outer circumference of each of the semi-cylindrical shaft portions 18. The second core 40 includes a base end surface 42 (see FIG. 2A) in contact with the bobbin portion 79.

In the inner circumference of each of the semi-cylindrical shaft portions 18 of the first core 30, the female screw is formed, and in the outer circumference of the convex portion 44 of the second core 40, the male screw is formed, with the result that both the screws may be screwed to couple the first core 30 and the second core 40 together.

The second core 40 includes a bottom surface 45 in contact with the top end surface 35 of the first core 30. The bottom surface 45 is formed in the shape of a flat surface perpendicular to the center line O.

The convex portion 44 protrudes from the bottom surface 45 in the shape of a cylinder, and its end surface 46 is in contact with an end surface 84 of the coil assembly 70. The end surface 46 of the convex portion 44 and the end surface 84 of the coil assembly 70 are formed in the shape of a flat surface perpendicular to the center line O.

The second core 40 includes a top end surface 47 formed in the shape of a flat surface perpendicular to the center line O and a boss portion 48 that protrudes from the top end surface 47. In the outer circumference of the cylindrical boss portion 48, a male screw 49 is formed. Between the top end surface 47 of the second core 40 and a nut 98, a plate 92 is provided, and the nut 98 is screwed to the male screw 49 to sandwich the plate 92.

The piston core assembly 20 is formed by assembling three components, that is, the first core 30, the second core 40 and the coil assembly 70. After the assembly of the piston core assembly 20, the piston core assembly 20 and the flux ring 50 are coupled to each other through the plates 91 and 92.

The first core 30, the second core 40 and the flux ring 50 each are formed of magnetic material, and the plates 91 and 92 are formed of non-magnetic material. Thus, the piston core assembly 20 and the flux ring 50 form a magnetic circuit that guides the magnetic flux of the electromagnetic coil 65 to the gap 16, and make a magnetic field act on the magnetic viscous fluid flowing through the main flow path 6.

In the piston core assembly 20, an air gap 54 (see FIG. 2B) is provided in the bridge holding concave portion 27 of the first core 30, and, since the cylindrical yoke portion 52 is provided around the air gap 54 side by side with the electromagnetic coil 65 so as to extend, a magnetic path that guides the magnetic flux of the electromagnetic coil 65 is secured.

Figure 2A:
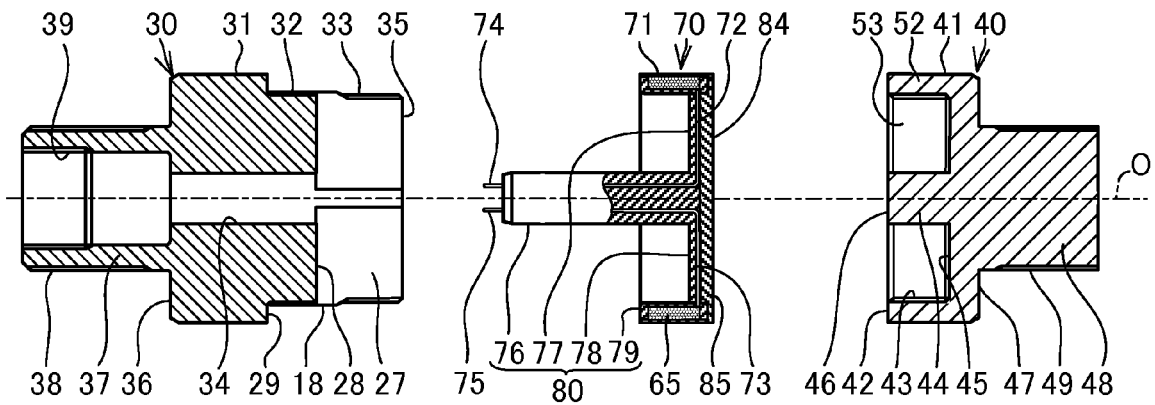
FIG. 2A is a process diagram showing a method of assembling a piston in the first embodiment.
Figure 2B:
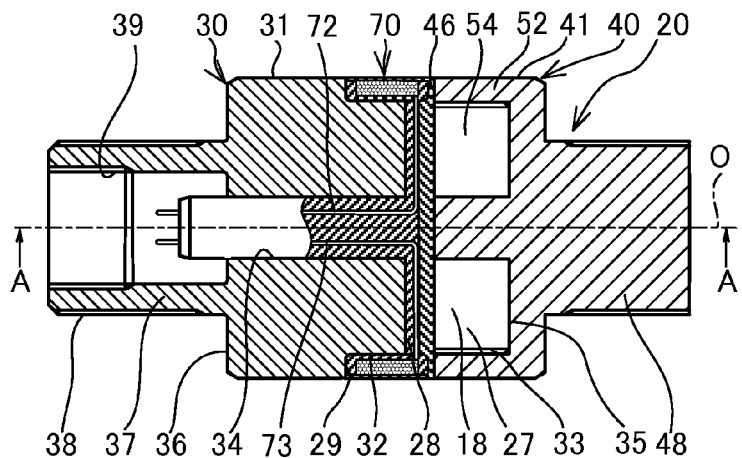
FIG. 2B is a process diagram showing the method of assembling the piston in the first embodiment.
Figure 2C:
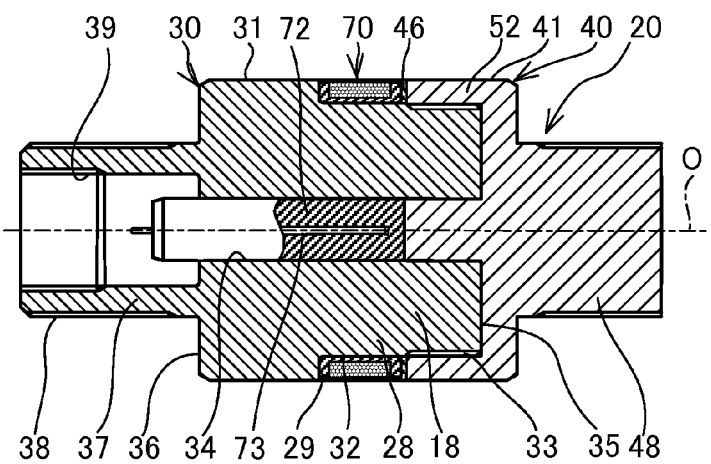
FIG. 2C is a process diagram showing the method of assembling the piston in the first embodiment.

FIGS. 2A to 2C will now be described. FIG. 2A is a cross-sectional view of the piston core assembly 20 showing a state before the assembly. FIG. 2B is a cross-sectional view of the piston core assembly 20 showing a state after the assembly. FIG. 2C is a cross-sectional view taken along line A-A of FIG. 2B.

When the piston core assembly 20 is assembled, the coil assembly 70 is assembled to the first core 30, and thus the plug portion 76 is inserted into the plug holding hole 34, and the terminals 74 and 75 of the lead wires 72 and 73 provided on the end surface of the plug portion 76 are arranged in the inside of the boss portion 37 of the first core 30.

When the piston core assembly 20 is assembled, the female screw 43 of the second core 40 is screwed to the male screw 33 of the first core 30. Thus the coil assembly 70 is pressed between a ring-shaped step portion 29 of the first core 30 and the base end surface 42 of the second core 40, and is also pressed between a fitting concave portion bottom surface 28 of the first core 30 and the end surface 46 of the second core 40. In this way, the first core 30, the coil assembly 70 and the second core 40 are coupled without being loose.

Figure 3A:
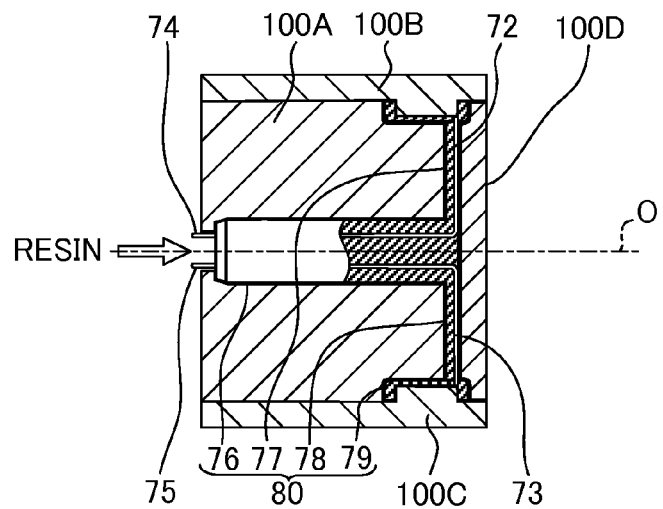
FIG. 3A is a process diagram showing a manufacturing method of a coil assembly in the first embodiment.
Figure 3B:
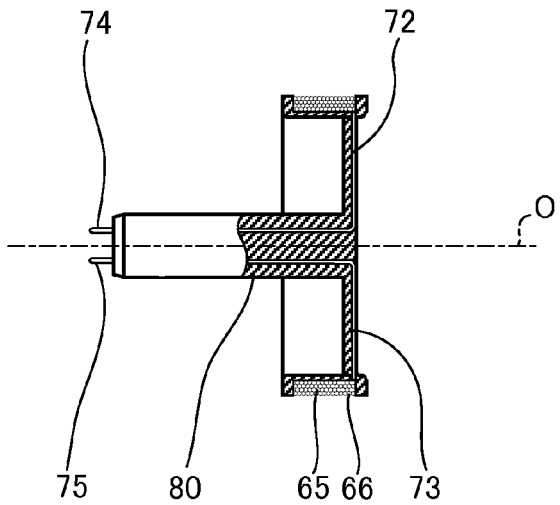
FIG. 3B is a process diagram showing the manufacturing method of the coil assembly in the first embodiment.
Figure 3C:
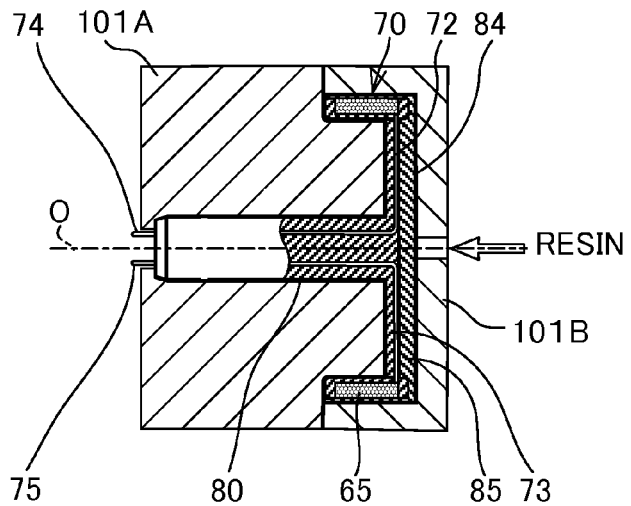
FIG. 3C is a process diagram showing the manufacturing method of the coil assembly in the first embodiment.

A manufacturing method of the coil assembly 70 shown in FIGS. 3A to 3C will now be described. FIG. 3A shows a primary molding step of molding the primary mold member 80. FIG. 3B shows a coil winding step of winding the electromagnetic coil 65. FIG. 3C shows a secondary molding step of molding the secondary mold member 85.

A step (not shown) of setting the two lead wires 72 and 73 to molds 100A to 100D is previously performed.

As shown in FIG. 3A, in the first molding step, a resin is poured into the molds 100A to 100D as indicated by an arrow, then the resin is solidified to form the primary mold member 80.

The primary mold member 80 includes the plug portion 76 that is arranged in the center of the piston 10, the two bridge portions 77 and 78 that extend from the plug portion 76 and the bobbin portion 79 that couples the end portions of the bridge portions 77 and 78 and extend circularly.

The plug portion 76 is formed in the shape of a cylinder extending concentrically about the center line O such that the plug portion 76 can be inserted into the plug holding hole 34 of the first core 30, which will be described later.

The two bridge portions 77 and 78 are provided to extend from the end portion of the plug portion 76 in the radial direction of the piston 10 perpendicular to the center line O, and are formed to extend along the same straight line as each other.

The bobbin portion 79 is formed in the shape of a ring extending concentrically about the center line O, and is supported by the two bridge portions 77 and 78. The bobbin portion 79 is a winding core for winding the magnet wire 66.

The lead wire 72 on one side extends along the plug portion 76 and the bridge portion 77 on one side. The lead wire 73 on the other side extends along the plug portion 76 and the bridge portion 78 on the other side. The base end portions of the lead wires 72 and 73 protrude, as the terminals 74 and 75, from the end surface of the plug portion 76. The top end portions of the lead wires 72 and 73 protrude, as unillustrated terminals, the inside of the bobbin portion 79.

As shown in FIG. 3B, in the coil winding step, the magnet wire 66 is wound around the bobbin portion 79 of the primary mold member 80 to form the electromagnetic coil 65. Both end portions of the magnet wire 66, which are not shown in the figure, protrude to the bobbin portion 79, and are connected to the top end portions (terminals) of the lead wires 72 and 73, respectively.

As shown in FIG. 3C, in the secondary molding step, the primary mold member 80 in which the electromagnetic coil 65 is wound around molds 101A and 101B is set, then a resin is poured as indicated by an arrow and the resin is solidified to form the secondary mold member 85.

The secondary mold member 85 is formed of a mold resin that surrounds the bridge portions 77 and 78 and the bobbin portion 79 of the primary mold member 80 and the magnet wire 66, and the mold resin is molded with the molds 101A and 101B. The primary mold member 80 and the secondary mold member 85 are formed integrally with each other, and form the resin portion of the coil assembly 70.

The coil assembly 70 formed as described above includes the ring-shaped bobbin portion 79 around which the electromagnetic coil 65 is wound, the plug portion 76 that is inserted into the inside of the first core 30 and the two bridge portions 77 and 78 that couple the bobbin portion 79 and the plug portion 76 together. The two lead wires 72 and 73 are provided to extend to the bobbin portion 79, the bridge portions 77 and 78 and the plug portion 76. The coil assembly 70 has a shape symmetrical with respect to the center line O.

Before the assembly of the coil assembly 70 to the first core 30 and the second core 40, the secondary mold member 85 is formed, and its mold resin portion is molded while being separated from the first core 30 and the second core 40. Thus, it is possible to effectively manufacture the coil assembly 70 and assemble it to the first core 30 and the second core 40.

The coil assembly 70 is not limited to the configuration described above, and the secondary mold member 85 may be formed by another manufacturing method.

A second embodiment will now be described.

Figure 4A:
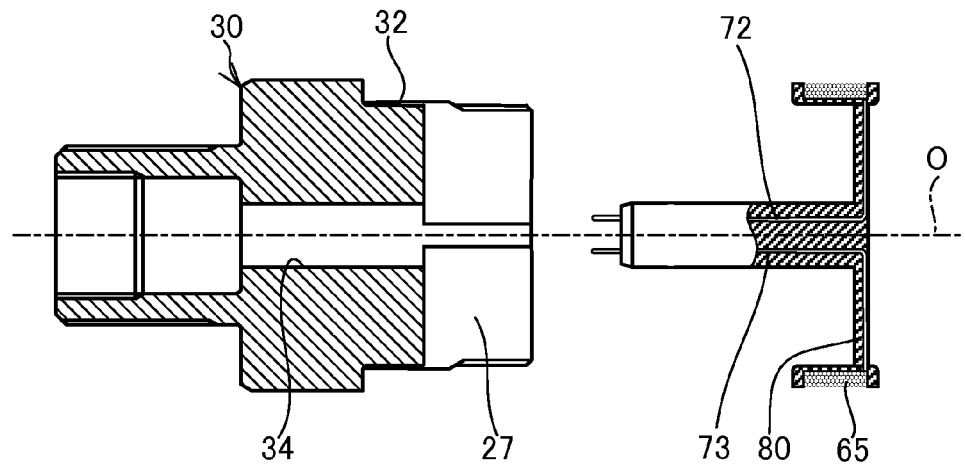
FIG. 4A is a process diagram showing a manufacturing method of the coil assembly in a second embodiment.
Figure 4B:
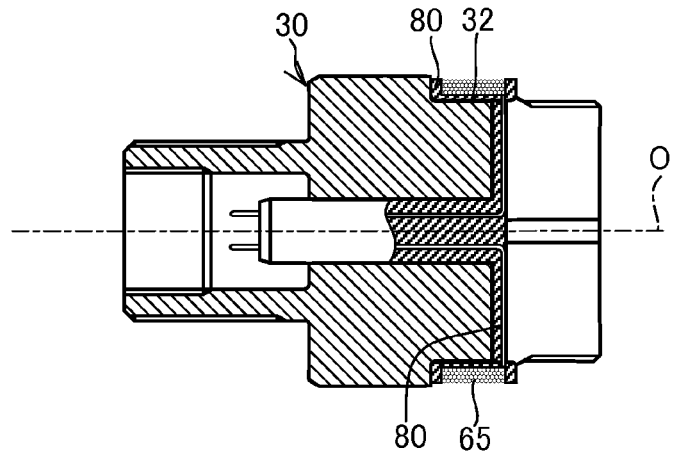
FIG. 4B is a process diagram showing the manufacturing method of the coil assembly in the second embodiment.
Figure 4C:
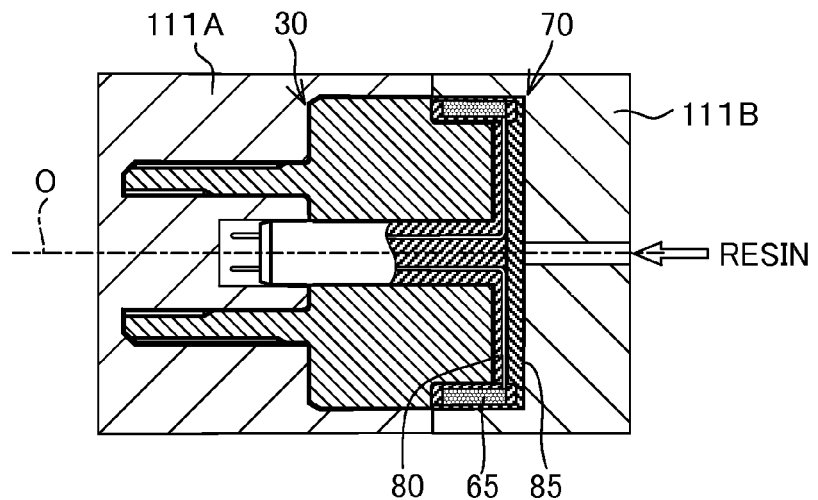
FIG. 4C is a process diagram showing the manufacturing method of the coil assembly in the second embodiment.

FIG. 4A shows a state before the primary mold member 80 is assembled to the first core 30. FIG. 4B shows a state where the primary mold member 80 is assembled to the first core 30. FIG. 4C shows a state the secondary mold member 85 is molded.

Since the coil assembly 70 of the present embodiment has basically the same configuration as in the first embodiment, a description will be given by identifying the same configuration as in the first embodiment with the same symbol.

In the present embodiment, while the coil assembly 70 in which the electromagnetic coil 65 is wound around the primary mold member 80 is assembled to the first core 30, the secondary mold member 85 is molded with molds 111A and 111B.

As shown in FIG. 4A, the primary mold member 80 in which the electromagnetic coil 65 is wound and the first core 30 are prepared.

Then, as shown in FIG. 4B, the primary mold member 80 is assembled to the first core 30.

Then, as shown in FIG. 4C, in the secondary molding step, the first core 30 to which the primary mold member 80 is assembled is set in the molds 111A and 111B, then a resin is poured as indicated by an arrow, the resin is solidified and thus the secondary mold member 85 is molded. Thereafter, the first core 30 and the coil assembly 70 formed integrally through the secondary mold member 85 are taken out of the molds 111A and 111B.

In the secondary mold member 85 formed as described above, the resin enters the gap between the primary mold member 80, the bobbin holding portion 32 of the first core 30 and the bridge holding concave portion 27, and thus the gap is filled.

Thus, since a needless gap formed within the piston 10 is reduced by the mold resin, it is possible to reduce the guiding of variations in pressure within the cylinder 9 to the inside of the piston 10.

A third embodiment will now be described.

Figure 5A:
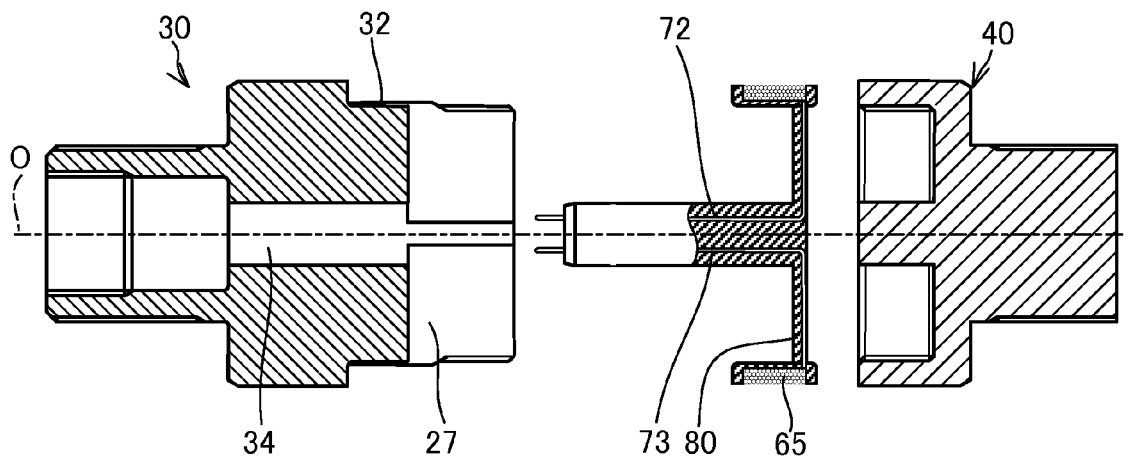
FIG. 5A is a process diagram showing a manufacturing method of the coil assembly in a third embodiment.
Figure 5B:
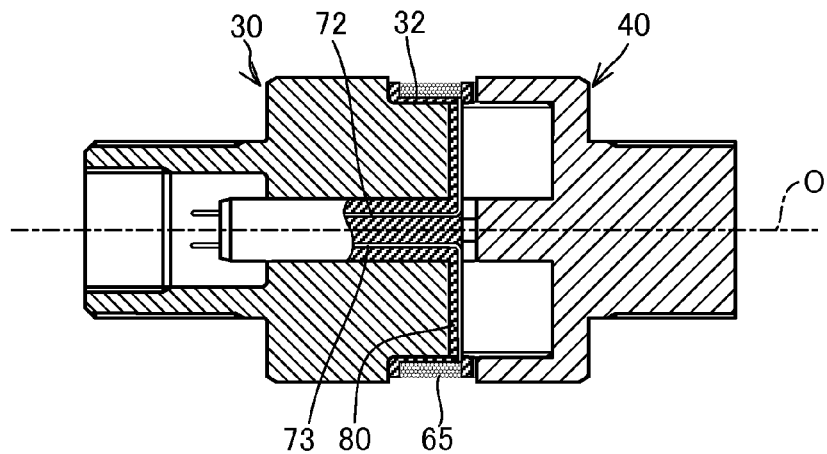
FIG. 5B is a process diagram showing the manufacturing method of the coil assembly in the third embodiment.
Figure 5C:
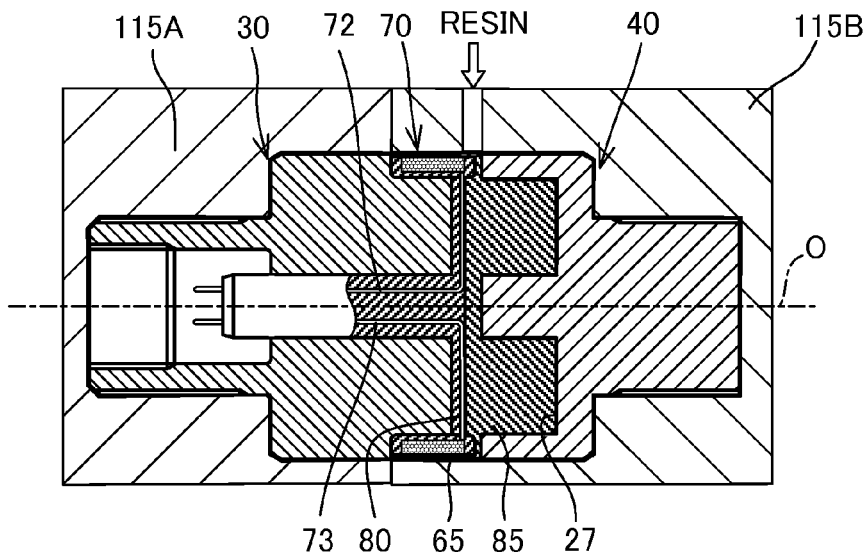
FIG. 5C is a process diagram showing the manufacturing method of the coil assembly in the third embodiment.

FIG. 5A shows a state before the second core 40 is assembled to the first core 30 and the primary mold member 80. FIG. 5B shows a state where the primary mold member 80 and the second core 40 are assembled to the first core 30. FIG. 5C shows a state where the secondary mold member 85 is molded.

Since the coil assembly 70 of the present embodiment has basically the same configuration as in the first embodiment, a description will be given by identifying the same configuration as in the first embodiment with the same symbol.

In the present embodiment, while the primary mold member 80 around which the electromagnetic coil 65 is wound is assembled between the first core 30 and the second core 40, it is put into molds 115A and 115B, and the secondary mold member 85 is molded.

As shown in FIG. 5A, the primary mold member 80 in which the electromagnetic coil 65 is wound and the first core 30 and the second core 40 are prepared.

Then, as shown in FIG. 5B, the primary mold member 80 is assembled to the first core 30 and the second core 40.

Then, as shown in FIG. 5C, in the secondary molding step, the first core 30 and the second core 40 to which the primary mold member 80 is assembled are set in the molds 115A and 115B, then a resin is poured as indicated by an arrow, the resin is solidified and thus the secondary mold member 85 is molded. Thereafter, the first core 30, the coil assembly 70 and the second core 40 formed integrally through the secondary mold member 85 are taken out of the molds 115A and 115B.

In the secondary mold member 85 formed as described above, the resin enters the gap between the primary mold member 80 and the first core 30, and the resin also enters the gap between the primary mold member 80 and the second core 40 and the interior of the bridge holding concave portion 27, and thus these gaps and spaces are filled.

Thus, since a needless gap formed within the piston 10 is reduced by the mold resin, it is possible to reduce the guiding of variations in pressure within the cylinder 9 to the interior of the piston 10.

A fourth embodiment will now be described.

Figure 6:
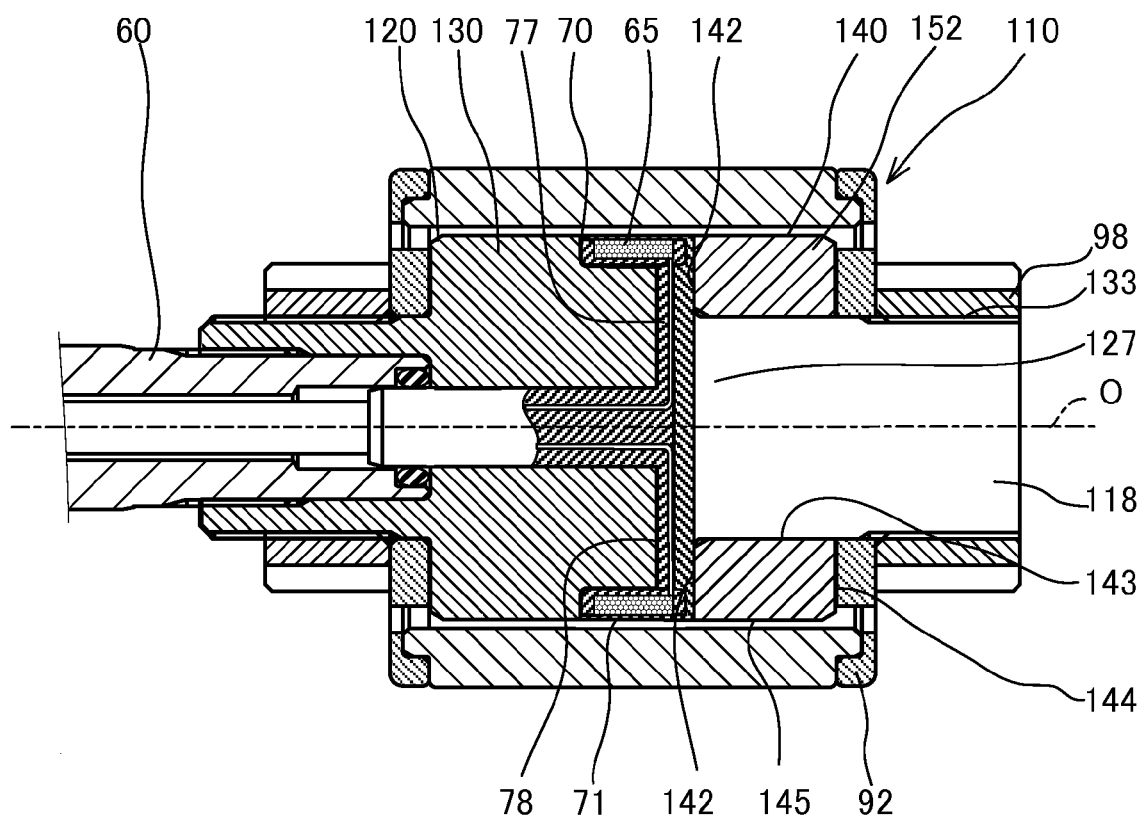
FIG. 6 is a cross-sectional view of a piston core assembly in a fourth embodiment.

FIG. 6 is a cross-sectional view of a piston 110. Since a piston core assembly 120 has basically the same configuration as in the first embodiment, a description will be given by identifying the same configuration as in the first embodiment with the same symbol.

The piston core assembly 120 of the piston 110 includes a hollow first core 130 that holds the coil assembly 70 and a second core 140 that sandwiches the coil assembly 70 with the first core 130.

The first core 130 includes a portion that holds the coil assembly 70, a portion to which the rod 60 is coupled and two semi-cylindrical shaft portions 118 that protrude to the opposite side (top end side) to the rod 60. A bridge holding concave portion 127 that holds the bridge portions 77 and 78 of the coil assembly 70 between the semi-cylindrical shaft portions 118 is open.

In the outer circumference of each of the semi-cylindrical shaft portions 118, a male screw 133 that is screwed into the nut 98 is formed.

The second core 140 is formed in the shape of a right cylinder, and its outer circumferential part forms yoke portions 152 aligned in the axial direction of the piston 10 with respect to the electromagnetic coil 65.

The second core 140 includes an inner circumferential surface 143 that is fitted to the outer circumference of each of the semi-cylindrical shaft portions 118, a base end surface 142 in contact with the coil assembly 70, a top end surface 144 in contact with the plate 92 and an outer circumferential surface 145 that extends without any step with the outer circumferential surface 71 of the coil assembly 70.

When the piston core assembly 120 is assembled, the coil assembly 70, the second core 140 and the plate 92 are assembled to the first core 130, and thereafter the nut 98 is screwed to the male screw 133. By tightening the nut 98, the nut 98 is pressed onto the second core 140 through the plate 92, and the base end surface 142 of the second core 140 is pressed onto the coil assembly 70.

As described above, in the piston 110 of the present embodiment, the second core 140 is fitted to the outer circumference of each of the semi-cylindrical shaft portions 118, the male screw 133 that is screwed into the nut 98 is formed in the outer circumference of each of the semi-cylindrical shaft portions 118 and the coil assembly 70 and the second core 140 are interposed between the nut 98 and the first core 130. In this way, the first core 130, the second core 140 and the coil assembly 70 are tightened and fixed through the nut 98 without being loose.

A fifth embodiment will now be described.

Figure 7:
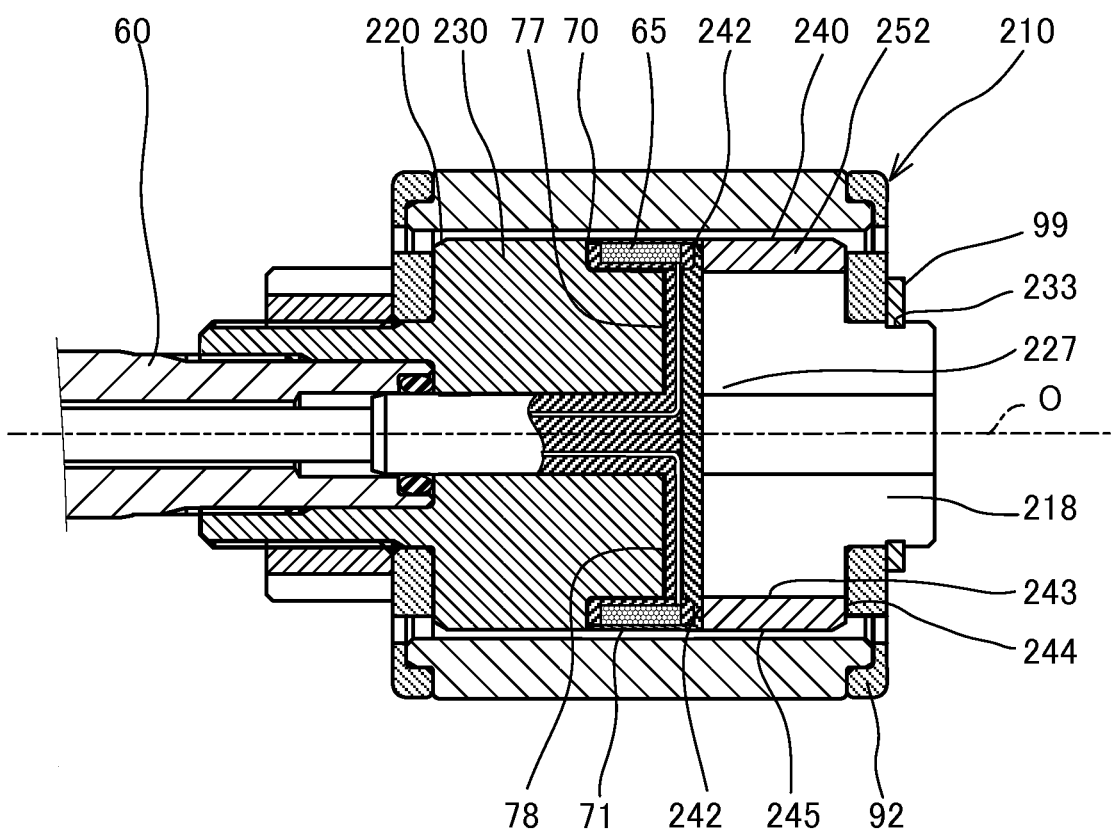
FIG. 7 is a cross-sectional view of a piston core assembly in a fifth embodiment.

FIG. 7 is a cross-sectional view of a piston 210. Since a piston core assembly 220 has basically the same configuration as in the first embodiment, a description will be given by identifying the same configuration as in the first embodiment with the same symbol.

The piston core assembly 220 of the piston 210 includes a hollow first core 230 that holds the coil assembly 70 and a second core 240 that sandwiches the coil assembly 70 with the first core 230.

The first core 230 includes a portion that holds the coil assembly 70, a portion to which the rod 60 is coupled and two semi-cylindrical shaft portions 218 that protrude to the opposite side (top end side) to the rod 60. A bridge holding concave portion 227 that holds the bridge portions 77 and 78 of the coil assembly 70 between each of the semi-cylindrical shaft portions 218 is open.

In the outer circumference of the top end portion of each of the semi-cylindrical shaft portions 218, a ring-shaped groove 233 is formed, and a stopper 99 is fitted to the ring-shaped groove 233. The stopper 99 is formed in the shape of a ring that is curved in shape of, for example, a letter C.

The second core 240 is formed in the shape of a right cylinder, and the entire forms yoke portions 252 aligned in the axial direction of the piston 210 with respect to the electromagnetic coil 65.

The second core 240 includes an inner circumferential surface 243 that is fitted to the outer circumference of each of the semi-cylindrical shaft portions 218, a base end surface 242 in contact with the coil assembly 70, a top end surface 244 in contact with the plate 92 and an outer circumferential surface 245 that extends without any step with the outer circumferential surface 71 of the coil assembly 70.

When the piston core assembly 220 is assembled, the coil assembly 70, the second core 240 and the plate 92 are assembled to the first core 230, and thereafter the stopper 99 is fitted into the ring-shaped groove 233 of each of the semi-cylindrical shaft portions 218. The stopper 99 prevents, through the plate 92, the second core 240 from coming off.

As described above, in the piston 210 of the present embodiment, the second core 240 is fitted to the outer circumference of each of the semi-cylindrical shaft portions 218, the ring-shaped groove 233 into which the stopper 99 is fitted is formed in the outer circumference of each of the semi-cylindrical shaft portions 218 and the coil assembly 70 and the second core 240 are interposed between the stopper 99 and the first core 230. In this way, the first core 230, the second core 240 and the coil assembly 70 are coupled through the stopper 99. Since only a small interposition space for the stopper 99 is needed, it is possible to reduce the size of the piston 210.

A sixth embodiment will now be described.

Figure 8:
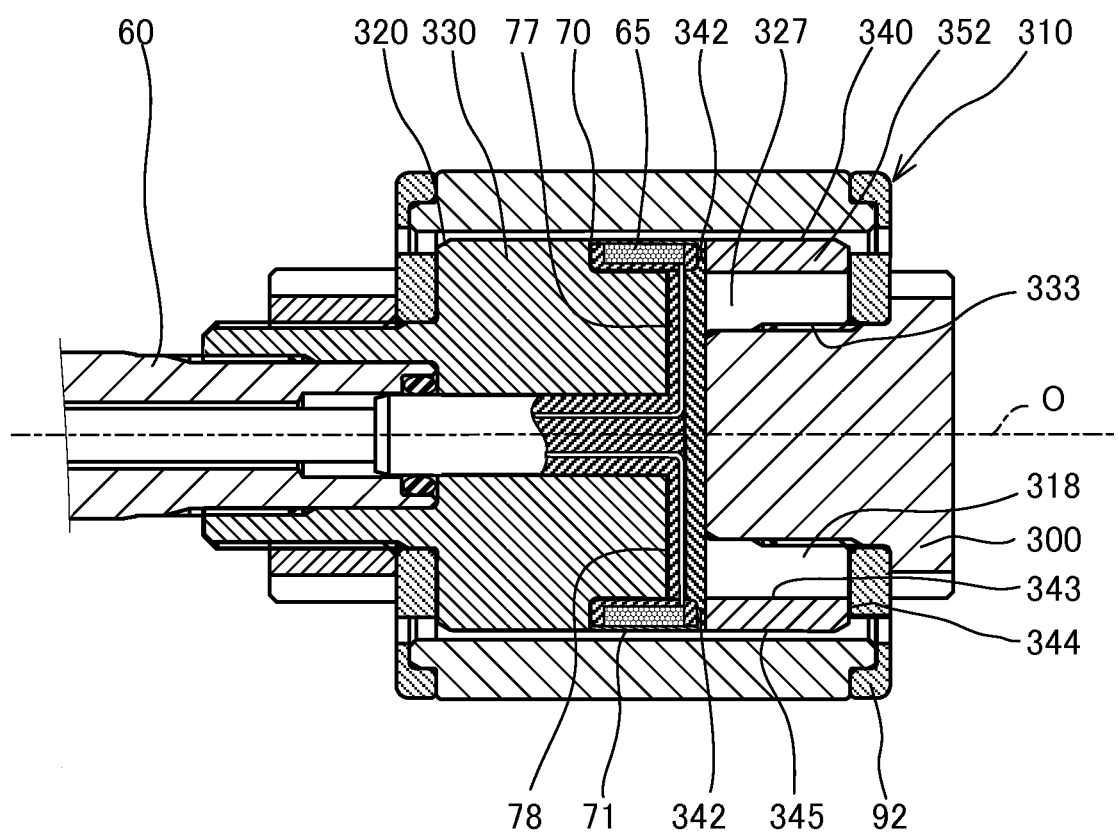
FIG. 8 is a cross-sectional view of a piston core assembly in a sixth embodiment.

FIG. 8 is a cross-sectional view of a piston 310. Since a piston core assembly 320 has basically the same configuration as in the first embodiment, a description will be given by identifying the same configuration as in the first embodiment with the same symbol.

The piston core assembly 320 of the piston 310 includes a hollow first core 330 that holds the coil assembly 70 and a second core 340 that sandwiches the coil assembly 70 with the first core 330.

The first core 330 includes a portion that holds the coil assembly 70, a portion to which the rod 60 is coupled and two semi-cylindrical shaft portions 318 that protrude to the opposite side (top end side) to the rod 60. A bridge holding concave portion 327 that holds the bridge portions 77 and 78 of the coil assembly 70 between each of the semi-cylindrical shaft portions 318 is open.

In the inner circumference of each of the hollow semi-cylindrical shaft portions 318, a female screw 333 is formed, and a bolt 300 that is screwed to the female screw 333 is provided.

The second core 340 is formed in the shape of a right cylinder, and the entire forms yoke portions 352 aligned in the axial direction of the piston 310 with respect to the electromagnetic coil 65.

The second core 240 includes an inner circumferential surface 343 that is fitted to the outer circumference of each of the semi-cylindrical shaft portions 318, a base end surface 342 in contact with the coil assembly 70, a top end surface 344 in contact with the plate 92 and an outer circumferential surface 345 that extends without any step with the outer circumferential surface 71 of the coil assembly 70.

When the piston core assembly 320 is assembled, the coil assembly 70, the second core 340 and the plate 92 are assembled to the first core 330, and thereafter the bolt 300 is screwed to the female screw 333 of each of the semi-cylindrical shaft portions 318. The bolt 300 prevents, through the plate 92, the second core 340 from coming off.

As described above, in the piston 310 of the present embodiment, the second core 340 is fitted to the outer circumference of each of the semi-cylindrical shaft portions 318, the female screw 333 to which a bolt 300 is screwed is formed in the inner circumference of each of the semi-cylindrical shaft portions 318 and the coil assembly 70 and the second core 340 are interposed between the bolt 300 and the first core 330. In this way, the first core 330, the second core 340 and the coil assembly 70 are coupled without being loose.

According to the above embodiments, action effects described below are produced.

Since the three components, that is, the first core 30, the second core 40 and the coil assembly 70 are assembled, and thus the two lead wires 72 and 73 are passed into the inside of the first core 30, the two electric wires 13 and 14 that are provided in the inside of the rod 60 and that supply the drive current to the lead wires 72 and 73 can be made electrically continuous. Thus, the controller can increase the flexibility of the circuit configuration that outputs the drive current. Furthermore, since the drive current output from the controller is passed to the electromagnetic coil 65 without flowing through the piston 10, the rod 60, the vehicle body or the like, it is possible to reduce electrical effects exerted on other devices installed in the vehicle. Furthermore, since the mold resin portion of the coil assembly 70 can be molded in the state where the mold resin portion is separated into the first core 30 and the second core 40, it is possible to efficiently manufacture the coil assembly 70 and assemble it to the first core 30 and the second core 40.

Furthermore, since the two lead wires 72 and 73 of the coil assembly 70 extend over the bobbin portion 79, the bridge portions 77 and 78 and the plug portion 76, it is possible to pass the two lead wires 72 and 73 through the inside of the first core 30 and connect them to the electric wires 13 and 14 provided in the inside of the rod 60.

The first core 30 includes the two semi-cylindrical shaft portions 18 that sandwich the bridge holding concave portion 27 and extend, the second core 40 includes the cylindrical yoke portion 52 coupled to the outer circumference of each of the semi-cylindrical shaft portions 18 and the yoke portion 52 is provided side by side with the electromagnetic coil 65 along the axial direction of the piston 10. Thus, since the yoke portion 52 plays a role in coupling the first core 30 and the second core 40 to each other and a role as a magnetic path guiding the magnetic flux of the electromagnetic coil 65, it is possible to reduce the number of components of the piston 10 and simplify the assembly operation.

The coil assembly 70 includes the primary mold member 80 that is molded such that the two lead wires 72 and 73 are embedded, the electromagnetic coil 65 that is formed with the magnet wire 66 wound around the outer circumference of the primary mold member 80 and the secondary mold member 85 that is molded such that the electromagnetic coil 65 is embedded between the secondary mold member 85 and the primary mold member 80. The electromagnetic coil 65 is surrounded by the mold resin, and thus the needless gap formed in the interior of the electromagnetic coil 65 is reduced. In this way, it is possible to secure the insulation of the electromagnetic coil 65 and reduce the guiding of variations in pressure within the cylinder 9 to the inside of the electromagnetic coil 65.

Since as shown in FIGS. 1 and 2A to 2C, the male screw 33 is formed in the outer circumference of each of the semi-cylindrical shaft portions 18, the female screw 43 is formed in the inner circumference of the yoke portion 52 and the male screw 33 and the female screw 43 are screwed to each other, the first core 30 and the second core 40 are pressed onto the coil assembly 70 and are tightened and fixed without being loose.

Since as shown in FIG. 6, the second core 140 is fitted to the outer circumference of each of the semi-cylindrical shaft portions 118, the nut 98 is screwed to the male screw 133 formed in the outer circumference of each of the semi-cylindrical shaft portions 118 and the coil assembly 70 and the second core 140 are interposed between the nut 98 and the first core 130, the first core 130 and the second core 140 are pressed, by the nut 98, onto the coil assembly 70, and are tightened and fixed without being loose.

Since as shown in FIG. 7, the second core 240 is fitted to the outer circumference of each of the semi-cylindrical shaft portions 218, the stopper 99 is fitted into the ring-shaped groove 233 formed in the outer circumference of each of the semi-cylindrical shaft portions 218 and the coil assembly 70 and the second core 240 are interposed between the stopper 99 and the first core 230, the first core 230, the second core 240 and the coil assembly 70 are fixed by the stopper 99, and the size of the piston 210 can be reduced.

Since as shown in FIG. 8, the second core 340 is fitted to the outer circumference of each of the semi-cylindrical shaft portions 318, the bolt 300 is screwed to the female screw 333 formed in the inner circumference of each of the semi-cylindrical shaft portions 318 and the coil assembly 70 and the second core 340 are interposed between the bolt 300 and the first core 330, the first core 330 and the second core 340 are pressed, by the bolt 300, onto the coil assembly 70, and are tightened and fixed without being loose.

As shown in FIGS. 3A to 3C, as the manufacturing method of the coil assembly 70, the primary molding step of molding the primary mold member 80 in which the two lead wires 72 and 73 are embedded, the coil winding step of winding the magnet wire 66 around the outer circumference of the primary mold member 80 to form the electromagnetic coil 65 and the secondary molding step of molding the secondary mold member 85 such that the electromagnetic coil 65 is embedded between the secondary mold member 85 and the primary mold member 80. Thus, since the mold resin portion of the coil assembly 70 is molded in the state where the mold resin portion is separated into the first core 30 and the second core 40, it is possible to efficiently manufacture the coil assembly 70 and assemble it to the first core 30 and the second core 40.

Since as shown in FIGS. 4A to 4C, in the secondary molding step, the first core 30 to which the primary mold member 80 is assembled is put into the molds 111A and 111B, and the secondary mold member 85 is molded, the gap formed between the first core 30 and the coil assembly 70 can be filled with the mold resin of the secondary mold member 85. Thus, it is possible to reduce the guiding of variations in pressure within the cylinder 9 to the interior of the piston 10 and prevent the piston 10 from receiving effects resulting from the pressure variations.

Since as shown in FIGS. 5A to 5C, in the secondary molding step, the first core 30 and the second core 40 to which the primary mold member 80 is assembled are put into the molds 115A and 115B, and the secondary mold member 85 is molded, the gap formed between the first core 30, the coil assembly 70 and the second core 40 can be filled with the mold resin of the secondary mold member 85. Thus, it is possible to reduce the guiding of variations in pressure within the cylinder 9 to the interior of the piston 10 and prevent the piston 10 from receiving effects resulting from the pressure variations.

The embodiments of the present invention described above are merely illustration of some application examples of the present invention and not of the nature to limit the technical scope of the present invention to the specific constructions of the above embodiments.

The present application claims a priority based on Japanese Patent Application No. 2012-039160 filed with the Japan Patent Office on Feb. 24, 2012, all the contents of which are hereby incorporated by reference.

The invention claimed is:

1. A magnetic viscous fluid damper using a magnetic viscous fluid, comprising:
    a cylinder that the magnetic viscous fluid is sealed in;
    a piston that is slidably disposed within the cylinder;
    two fluid chambers that are partitioned by the piston;
    a hollow rod that is coupled to the piston and protrudes to an outside of the cylinder;
    an electromagnetic coil having a magnet wire wound around the piston;
    two lead wires that extend from both ends of the magnet wire; and
    a coil assembly in which the electromagnetic coil and the two lead wires are embedded in a mold resin,
    wherein the piston includes a hollow first core coupled to the rod and a second core that sandwiches the coil assembly with the first core,
    wherein the two lead wires are passed through an inside of the first core and are electrically continuous with an electric wire passed through an inside of the rod,
    wherein the coil assembly includes a primary mold member that is molded such that the two lead wires are embedded, and the electromagnetic coil is wound around an outer circumference of the primary mold member and a secondary mold member that is molded such that the electromagnetic coil is embedded between the primary mold member and the secondary mold member after the primary mold member is assembled on the first core and the first core is set in molds, and
    wherein a flow path via which the magnetic viscous fluid flows between the two fluid chambers is defined by an outer circumferential surface of the secondary mold member.

2. The magnetic viscous fluid damper according to claim 1, wherein:
    the coil assembly includes a ring-shaped bobbin portion around which the electromagnetic coil is wound, a plug portion that is inserted into an inside of the first core and a bridge portion that couples the bobbin portion and the plug portion together; and
    the two lead wires extend over the bobbin portion, the bridge portion and the plug portion.

3. The magnetic viscous fluid damper according to claim 2, wherein:
    the first core includes a bridge holding concave portion that holds the bridge portion and two semi-cylindrical shaft portions that sandwich the bridge holding concave portion and extend; and
    the second core includes a cylindrical yoke portion that is coupled to an outer circumference of the two semi-cylindrical shaft portions and is provided side by side with the electromagnetic coil along an axial direction of the piston.

4. The magnetic viscous fluid damper according to claim 3, wherein:
    the piston includes a male screw that is formed in the outer circumference of the two semi-cylindrical shaft portions and a female screw that is formed in an inner circumference of the yoke portion and is screwed to the male screw.

5. The magnetic viscous fluid damper according to claim 3, wherein:
    the second core is fitted to the outer circumference of the two semi-cylindrical shaft portions;
    the piston includes a male screw that is formed in the outer circumference of the two semi-cylindrical shaft portions and a nut that is screwed to the male screw; and
    the coil assembly and the second core are interposed between the nut and the first core.

6. The magnetic viscous fluid damper according to claim 3, wherein:
    the second core is fitted to the outer circumference of the two semi-cylindrical shaft portions;
    the piston includes a ring-shaped groove that is formed in the outer circumference of the two semi-cylindrical shaft portions and a stopper that is fitted to the ring-shaped groove; and
    the coil assembly and the second core are interposed between the stopper and the first core.

7. The magnetic viscous fluid damper according to claim 3, wherein:
    the second core is fitted to the outer circumference of the two semi-cylindrical shaft portions;
    the piston includes a female screw that is formed in the inner circumference of the two semi-cylindrical shaft portions and a bolt that is screwed to the female screw; and
    the coil assembly and the second core are interposed between the bolt and the first core.

8. A manufacturing method of the coil assembly used in the magnetic viscous fluid damper according to claim 1, the method comprising:
    a primary molding step of molding a primary mold member in which the two lead wires are embedded;
    a coil winding step of winding the magnet wire around an outer circumference of the primary mold member to form the electromagnetic coil; and
    a secondary molding step of molding a secondary mold member such that the electromagnetic coil is embedded between the primary mold member and the secondary mold member.

9. The manufacturing method of the coil assembly according to claim 8, wherein:
    in the secondary molding step, the first core to which the primary mold member is assembled is put into a mold, and the secondary mold member is molded.

10. The manufacturing method of the coil assembly according to claim 8, wherein:
    in the secondary molding step, the first core and the second core to which the primary mold member is assembled are put into a mold, and the secondary mold member is molded.

* * * * *